June 28, 1960 M. J. HALLE ET AL 2,942,328
FLUXLESS SOLDER SEAL
Filed Aug. 28, 1956
Fig. 1
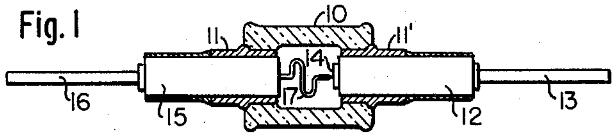
Fig. 4 Fig. 2 Fig. 3
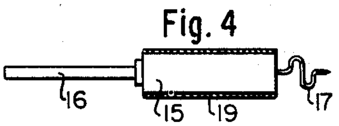
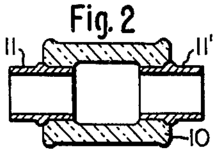
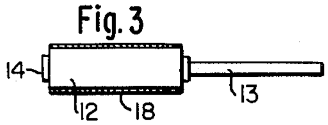
Fig. 5
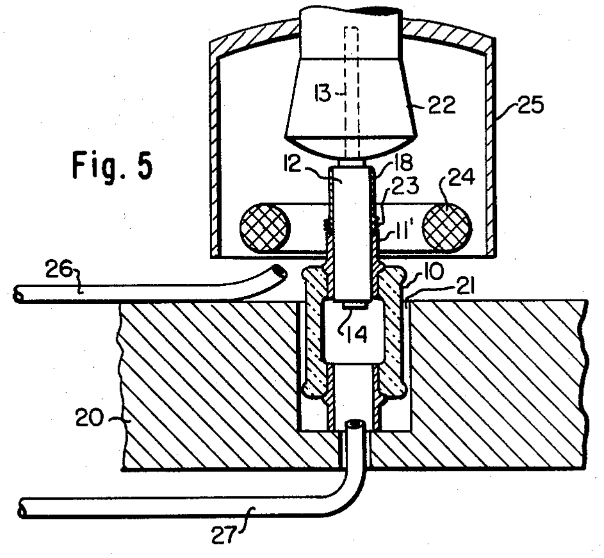
Fig. 6
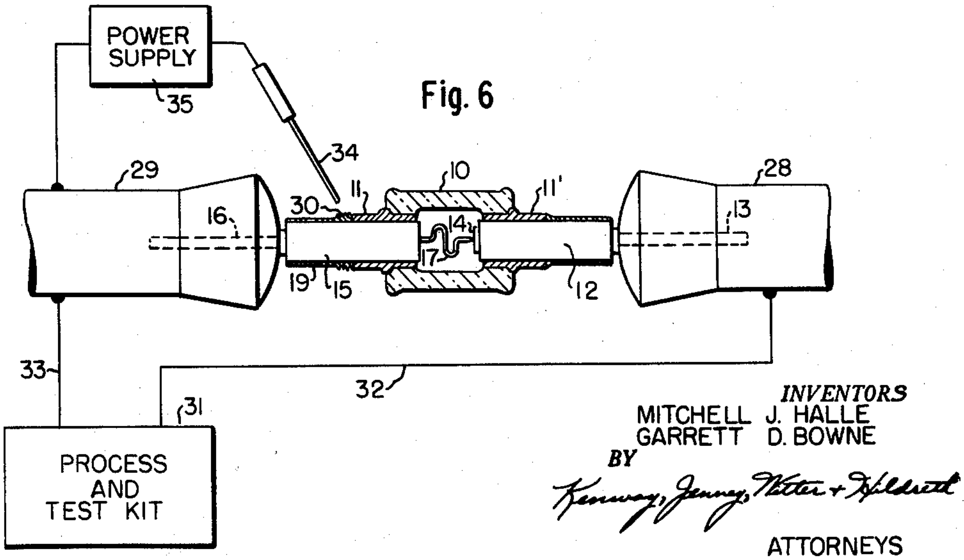
INVENTORS
MITCHELL J. HALLE
GARRETT D. BOWNE
BY Kenway, Jenney, Witter & Hildreth
ATTORNEYS 2,942,328
Patented June 28, 1960

2,942,328

FLUXLESS SOLDER SEAL

Mitchell J. Halle, Wakefield, and Garrett D. Bowne, Marblehead, Mass., assignors, by mesne assignments, to Sylvania Electric Products Inc., Wilmington, Del., a corporation of Delaware Filed Aug. 28, 1956, Ser. No. 606,749

4 Claims. (Cl. 29—25.3)

This invention relates generally to the manufacture of electrical translating devices and more particularly to the assembly and sealing of components of such devices.

There are numerous applications in industry and elsewhere for electrical translating devices employing as their active elements some type of semiconductor material and rectifying contacts. One structure which has enjoyed particularly widespread acceptance is that which includes a die of germanium or silicon and a contacting cat whisker hermetically enclosed in glass or other suitable material. The reasons for the popularity of such devices are their small size, rugged construction, and imperviousness to atmospheric conditions.

In Patent No. 2,697,805 issued to Ralph B. Collins, Jr., and assigned to the assignee of the present invention, a typical device is disclosed. It is a semiconductor diode having as its body a cartridge or capsule composed of a short tube of insulating material such as glass. Metal sleeves or collars are sealed to both ends of the tube, and metal rods or studs are soldered or otherwise sealed into the metal sleeves. The active elements are mounted on the juxtaposed ends of the rods or studs within the hermetically sealed chamber of the capsule. In Patent No. 2,697,309, issued to Paul E. Gates and also assigned to the assignee of the present invention, an improved method of making glass-to-metal seals is disclosed. This improved method is particularly useful and valuable in sealing the metal sleeves to the cylinder of insulating material in the device of Collins. A superior capsule of cylinder and sleeves produced at a very high rate on automatic equipment has been achieved by following the teaching of Gates. Up to the present time, however, there has not been available a comparable technique for assembling with the capsules the rods or studs which support the active diode elements.

The present practice is to plate the metal sleeves subsequent to their being sealed to the insulating tubing. Studs with leads attached are also suitably plated and the active elements, a semiconductor crystal die and a contact-making whisker element, are attached to the studs and then treated by various chemical, electro-chemical, and mechanical means known in the art in preparation for assembly. These parts, a capsule, a first stud having a crystal die on its face and a lead attached to its other end, and a second stud having a contact element fastened on its face and a lead attached to its other end are then assembled to provide a completely hermetic seal about the chamber wherein the semiconductor die and the whisker or contact element are cooperatively positioned. The assembly operation is accomplished by placing the capsule in a jig and then inserting the rod or mounting structure carrying the semiconductor die into the uppermost metal sleeve or collar of the capsule. The outer diameter of the plated rod or stud is smaller than the inner diameter of the plated sleeve so that no force is required for this insertion.

The insertion is terminated when the die is within the chamber of the capsule, the stud is encircled by the metal sleeve, and the lead is extending outside of the capsule. A solder ring of proper dimensions is then placed over the lead and positioned on the top edge of the metal sleeve encircling the stud. A suitable solder flux must also be provided either as a core within the solder ring or in some other manner. Heat is then applied to melt the solder and permit it to alloy with the plating material on the stud and sleeve and thus form a hermetic mechanical seal. The other rod or mounting structure carrying the contact element or cat whisker is adjusted in position until the relation between contact element and crystal die gives suitable electrical response. After this adjustment is made the other rod is permanently sealed to the other sleeve exactly as the first rod is sealed to the first sleeve. Again the diameter of the plated stud is sufficiently less than the inner diameter of the sleeve to permit easy insertion of the stud through the sleeve.

Although large quantities of crystal diodes have been produced by this method, several undesirable factors are involved. If electrical translators employing semiconductors are to achieve the fullest utilization of their possibilities, they must be manufactured at a low unit cost by achieving efficiencies which can be obtained only through increased use of automatic and semi-automatic equipment. The steps of placing a solder ring in position adjacent the stud and sleeve and properly applying flux are somewhat complicated and have resisted automation. This technique also requires solder rings which must be fabricated to close tolerances if they are to fit over the stud and, upon melting, to fill the small space between the stud and sleeve so as to form a good tight hermetic seal.

The danger of contamination of the diode during this assembly process is also considerable. The presence of contaminants on the surface of the semiconductor adversely affects the characteristics and life of the crystal diode. Flux and other contaminants acquired during sub-assembly operation can easily be removed by suitable treatment prior to final assembly. However, after the final assembly here involved, further cleaning of the critical elements is impossible. Under present manufacturing conditions great care is taken to avoid the entrance of flux into the chamber of the capsule particularly from the end containing the semiconductor die. Inevitably, though, due to the necessary clearance between the stud and the sleeve or rim of the capsule, flux enters the chamber and contaminates a certain number of semiconductors.

Therefore, it is an object of our invention to provide an improved method of assembling electrical translating devices.

It is another object of our invention to provide a method of sealing the active elements of a semiconductor electrical translator into the body or capsule so as to achieve a hermetically sealed unit with no contamination of the active elements by flux.

It is a further object of our invention to provide an improved method of making a hermetic seal between a metallic sleeve and stud.

It is a feature of our invention to eliminate the use of solder rings by providing the solder material on the contacting surfaces of the stud and sleeve of the parts being assembled.

It is another feature of our invention to provide sufficient solder material on the parts to be assembled so that during assembly the excess of solder is peeled or scraped from the contact areas thus exposing fresh unoxidized surfaces of the solder material and encouraging the formation of a good seal.

The method of our invention by which the foregoing objects are realized includes the application of a layer of solderable material to the mounting structure or stud and to the sleeve or collar so that outside dimension of the stud is greater than the inside dimension of the sleeve or collar. The active elements are usually then placed on the studs and the studs are forced into the sleeve thereby exposing fresh unoxidized solder material at the contacting surfaces. Heat is applied to melt the solder material which, upon cooling, forms a bond between the studs and the sleeves. Other objects and features of the invention will be apparent from a detailed discussion of the accompanying drawings in which:

Fig. 1 is an enlarged view partly in cross-section of a semi-conductor crystal diode assembled according to the method of our invention, Figs. 2, 3, and 4 are similar views showing the subasesmblies of the crystal diode of Fig. 1 prior to final assembly, Fig. 5 illustrates one step in the assembly of the crystal diode of Fig. 1 according to the method of the invention, Fig. 6 illustrates another step in the assembly of the diode of Fig. 1 according to the method of the invention but employing a different arrangement of apparatus from that shown in Fig. 5.

In Fig. 1 there is shown a completed crystal rectifier or diode the capsule of which includes a cylinder 10 of an insulating material, such as glass, sealed between two similar metallic sleeves or collars 11 and 11'. A stud or rod 12 serves as the mounting structure for a die 14 of semiconductor material such as germanium or silicon. The semiconductor die is connected physically and electrically to the face of the stud and a lead 13 is attached to the opposite end of the stud. The stud 12 is rigidly and hermetically sealed into the sleeve 11'. A second stud 15 with lead 16 attached and carrying a cat whisker 17 is similarly sealed into the other sleeve 11 of the capsule. The rectifying action of the diode is derived from the cooperative action of the cat whisker and semiconductor die.

The manner in which the device of Fig. 1 is fabricated is shown in the remaining figures of the drawing. In Fig. 2 there is shown the capsule which forms the body of the device. It includes a glass cylinder 10 to which metal sleeves or collars 11 and 11' are sealed at each end. The sleeves are formed from a metal capable of being sealed to the glass. The primary requirement for such metals is a coefficient of thermal expansion approximately equal to that of the glass to avoid fracture of the seal due to unequal expansion or contraction. A material frequently sealed to glass and having the desired characteristics is an iron nickel alloy known by the trade name "Kovar." Sleeves fabricated from "Kovar" may be sealed to the glass cylinder as by the method disclosed in the above-mentioned patent to Gates. The exposed metal portions of the completed capsule are then plated, first, lightly with copper and then, more heavily with tin.

Figs. 3 and 4 show the studs which serve as mounting structures for the active elements of the diode with these elements attached. Fig. 3 shows a metallic stud or rod 12 to which a lead 13 is secured as by welding. A layer of solderable material 18 is then applied to the stud as by plating lightly with copper and then heavily with tin. An alternative means of applying layer 18 is by lightly plating the stud with tin and then dipping in a lead-tin or other solder material.

We have found that for use with capsules having sleeves with an inside diameter of .074" after plating, the plated stud should have an outside diameter of .076" to .082". If tolerances are held even more closely, optimum results with sleeves of an inside diameter of .074" are had with plated studs of an outside diameter of .078" to .080".

The semiconductor die 14 is of germanium or silicon prepared by techniques well known in the art, incluuding purification of material, addition of conductivity-imparting impurity, growth of single crystal, division into individual dice, and treatment by various chemical and electro-chemical techniques. The die 14 is fastened as by soldering to the end of the stud 12, generally after the stud has been plated.

Fig. 4 shows a stud or rod 15 with a lead 16 and a layer of solderable material 19. It is prepared in exactly the same manner as the stud 12 of Fig. 3. The contact element or cat whisker 17 is composed of a suitable material such as tungsten and is fastened as by welding to the stud usually after plating of the stud. The whisker may have any configuratoin depending on the degree of resilience and the type of contact desired with the semiconductor. In this showing, however, the whisker 17 has an S shape and a pointed tip.

Fig. 5 illustrates the first stage in the assembly of the subassemblies. The capsule is placed in a jig 20 in which a recess 21 is formed. Recess 21 is of slightly larger diameter than cylinder 10 and holds the unit in an upright position. A collet 22 has a central opening for holding lead 13 with the stud attached thereto securely in a vertical position centered above the opening in the sleeve 11'. The stud 12 carrying the crystal die 14 is forced into the metal sleeve 11' as collet 22 is lowered. Continued movement of the collet 22 forces the stud 12 further, usually until stud 12 is in contact with the entire inner surface of the sleeve 11'. Because layer 18 of solder material is of greater diameter than the opening in the sleeve 11', the soft solder material is peeled or stripped from the matching surfaces of the stud and the sleeve resulting in most of the excess solder being deposited in a ring 23 outside the capsule. By this action, a tight mechanical fit is achieved between the stud and the sleeve. The outer surfaces of the solder material on both the stud and the sleeve whether tin, a lead-tin alloy, or other material is literally scraped clean during the process. In other words, clean unoxidized solder surfaces are exposed on both the stud and the sleeve. We prefer to employ a greater thickness of solder material on the stud than on the sleeve so that most of the scraping action is on the surface of the stud. In this way a substantial excess of solder develops at the outer end of the sleeve while there is only sufficient lateral movement of the solder on the sleeve to expose a clean surface.

The next step is the melting of the solder and permitting it to cool to form a tight hermetic bond. This step may be performed in conjunction with the insertion step described above, but because the insertion step achieves a rigid mechanical connection, it is not essential that heat be applied immediately to join the parts. Any necessary processing steps may be carried out prior to the melting of the solder, or a considerable delay may be tolerated. However, we have chosen to describe that part of our invention illustrated in Fig. 5 with the heating step taking place immediately after insertion of the first stud into the sleeve of the capsule.

The parts may be heated by any of several means. In this case the region of the assembled parts which is to be heated may, as illustrated, be surrounded by a suitable induction coil 24 which is connected to a source of RF energy, not shown. A portion of the coil 24 is cut away to avoid confusion in the drawing. A hood 25 is lowered over the region to be heated. To prevent unwanted oxidation, a suitable atmosphere for the region to be heated is obtained by introducing a nonoxidizing gas, such as the inert gas argon, through the lines 26 and 27 at a pressure slightly in excess of atmospheric. When RF energy is applied to the induction coil 24, heat is induced in the metallic members in the field of the coil and the solder melts. The wiping action of pressing the stud into the sleeve of the capsule has previously stripped off the outer layer of solder material and piled it up in a ring 23; hence, there are only clean unoxidized surfaces of the solder in contact. The solder flows freely and fills all voids as it melts under the influence of the induced heat to form a tight hermetic bond. The presence of the inert atmosphere precludes any possible oxidation of the surfaces and, also, the flow of inert gas from line 27 cools the semiconductor die preventing injury to the die or loosening of its solder bond to the stud.

Fig. 6 illustrates the apparatus and method employed in finally assembling the device of Fig. 1. At this point the stud 12 with the die 14 mounted on the inner end thereof is permanently and hermetically sealed into the sleeve 11'. It is now necessary to seal the stud 15 on which the cat whisker 17 is mounted into its sleeve with the cat whisker and semiconductor die in rectifying cooperation.

The subassembly of the capsule and the stud 12 is inserted and firmly held by a collet 28 which grips lead 13 rigidly. The subassembly of stud 15, lead 16 and cat whisker 17 shown in Fig. 4 is firmly held by a collet 29 which tightly engages lead 16. Collet 28 is held steady while collet 29 is moved horizontally toward collet 28 by an appropriate means, not shown, until contact element 17 is within the cylinder 10. As the stud 15 enters the sleeve 11 of the capsule a portion of the solder layer 19 is peeled back to pile up in a ring 30 of solder material outside the sleeve. This wiping action cleans the matching surfaces of both the stud and the sleeve and the force fit provides a close mechanical connection between them.

Collet 29 is moved until proper rectifying contact between the whisker element 17 and the semiconductor die 14 is had. In order to provide the proper pressure of the contact, this step is preferably monitored by suitable electrical apparatus. A test and processing kit 31 is shown as connected by leads 32 and 33 to the collets 28 and 29 respectively and thence to the leads 13 and 16 respectively. This kit may contain in addition to the monitoring apparatus, equipment to pulse the diode or provide other electrical treatment. It is essential, of course, for monitoring or electrical processing that collets 28 and 29 be properly insulated from each other.

After the relative position of the stud 15 in sleeve 11 has been adjusted to optimize the rectifying connection between the semiconductor crystal 14 and the contact element 17, heat is applied to melt the solder. The heat may be provided by RF induction as in Fig. 5, but we have found it more convenient in this instance to employ a carbon rod 34 connected in series through a power supply 35 to collet 29. The carbon rod 34 is moved by a means not shown into contact with stud 15. Current flows through the circuit thus completed causing the tip of the carbon rod 34, which makes a high resistance contact with the stud 15, to heat up. Stud 15 and sleeve 11 are also raised in temperature melting the solder between them. The flow of current is discontinued after the solder melts and the solder then solidifies to form a tight hermetic seal between the stud and the sleeve. It has been found desirable to insure ideal solder flow by conducting this step in an inert atmosphere. This may be accomplished by enclosing the apparatus shown in Fig. 6 in a suitable box or hood, not shown, to which there is supplied an inert gas.

The person skilled in the art will find many variations possible within the scope of our invention. For example, the application of heat may be accomplished in any of several different ways; only two are illustrated herein. The use of a reducing atmosphere rather than an inert gas also is feasible. The configurations and construction of the jigs and holding fixtures may vary considerably depending on the geometry of the parts of the particular device being assembled. The method of this invention may also be employed in assembling semiconductor devices having alloyed or other junctions previously formed in the semiconductor die with the contact element forming an ohmic connection when making contact. Therefore, the invention should be limited only by the spirit and scope of the appended claims.

What we claim is:

1. The method of assembling a semiconductor device which includes a first rod of uniform cross-section for supporting a die of semiconductor material on the end thereof, a second rod of uniform cross-section for supporting a contact element on the end thereof and an open-ended capsule having a central portion composed of non-conductive material and first and second metallic sleeves sealed to the opposite ends of said central portion each of said sleeves having an inside diameter of uniform cross-section which comprises plating said first and second sleeves first relatively lightly with copper then relatively heavily with tin to form the inside diameters of uniform cross-section, plating said first and second rods first relatively lightly with copper then relatively heavily with tin until the outside diameter of each of said rods is of uniform cross-section and is greater than the inside diameter of said sleeves, mounting said die of semiconductor material on the end of said first rod, mounting said contact element on the end of said second rod, inserting said first rod in said first sleeve to expose unoxidized tinned contacting surfaces therebetween and to accumulate a first ring of solid tin surrounding the point of entry of said first rod into said first sleeve, enclosing said first rod and said capsule, supplying a nonoxidizing gas to the enclosed zone about said first rod and said capsule, at least a portion of said gas being applied through said capsule, subsequently applying heat to said first rod and said first sleeve to melt the tin plating on said first rod and on said first sleeve and to melt said first ring of solid tin, removing said heat to permit bonding of said first rod and said first sleeve, inserting said second rod in said second sleeve to expose unoxidized tinned contacting surfaces therebetween and to accumulate a second ring of solid tin surrounding the point of entry of said second rod into said second sleeve, applying electrical potentials to said first rod and said second rod, adjusting the degree of insertion of said second rod in accordance with effects of said electrical potentials determined by the contact of said contact element with said die of semiconductor material, enclosing said second rod and said capsule, supplying a nonoxidizing gas to the enclosed zone about said second rod and said capsule, subsequently applying heat to said second rod and said second sleeve to melt the tin plating on said second rod and on said second sleeve and to melt said second ring of solid tin, and removing said heat to permit bonding of said second rod to said second sleeve.

2. The method of assembling a semiconductor device which includes a first rod, a second rod and an open-ended capsule having metallic sleeves sealed to the ends thereof which comprises plating said sleeves first relatively lightly with copper and then relatively heavily with tin, plating said first rod first relatively lightly with copper then relatively heavily with tin until the outside diameter of said first rod exceeds in size the inside diameter of one of said sleeves, mounting a die of semiconductor material on the end of said first rod, plating said second rod first relatively lightly with copper then relatively heavily with tin until the outside diameter of said second rod exceeds in size the inside diameter of the other of said sleeves, mounting a contact element on the end of said second rod, inserting said first rod in said one of said sleeves to expose unoxidized tinned contacting surfaces of said first rod and said one of said sleeves and to accumulate a first ring of solid tin surrounding the point of entry of said first rod into said one of said sleeves, enclosing said first rod and said capsule in a heating zone, supplying a nonoxidizing gas to the enclosed zone at a pressure above atmospheric, thereafter applying heat to said first rod and said one of said sleeves to melt the tin plating on said first rod and on said one sleeve and to melt said first ring of solid tin, at least some of said gas being supplied through the open end of said capsule during the application of heat to said first rod and said one of said sleeves, whereby said die of semiconductor material is cooled by said gas, removing said heat to permit bonding of said first rod to said one of said sleeves, inserting said second rod in said other of said sleeves to expose unoxidized tinned contacting surfaces of said second rod and said other of said sleeves and to accumulate a second ring of solid tin surrounding the point of entry of said second rod into said other of said sleeves, adjusting the extent of insertion of said second rod into said other of said sleeves to obtain desired electrical characteristics determined by the contact of said contact element and said die of semiconductor material, thereafter applying heat to said second rod and said other of said sleeves in a non-oxidizing atmosphere to melt the tin plating on said second rod and on said other sleeve and to melt said second ring of solid tin, and removing said heat to permit cooling and solidification of said tin to form a bond between said second rod and said other of said sleeves.

3. The method of assembling a semiconductor device which includes a first support rod of uniform cross-section, a second support rod of uniform cross-section, and an open-ended capsule including metallic sleeves having inside diameters of uniform cross-section sealed to the ends thereof which comprises plating said sleeves with solderable material until the inside diameter thereof reaches a predetermined value of uniform cross-section, plating said rods until the outside diameter thereof is of uniform cross-section and exceeds said predetermined value, mounting a semiconductor die on the end of said first support rod, mounting a contact element on the end of said second support rod, pressing said first rod into one of said sleeves to provide a ring of solid solderable material adjacent the point of entry of said first rod into said one sleeve and to expose contacting surfaces of unoxidized solid solderable material, thereafter applying heat to said capsule and to said first rod in a non-oxidizing atmosphere to melt said solderable material, removing said heat to permit said solderable material to cool and form a bond between said one sleeve and said first rod, pressing said second rod into the other of said sleeves until said die and said contact element are at least in contact, thereby providing a ring of solid solderable material adjacent the point of entry of said second rod into said other sleeve and exposing contacting surfaces of unoxidized solid solderable material, thereafter applying heat to said capsule and to said second rod in a non-oxidizing atmosphere to cause melting of said solderable material adjacent thereto, and removing said heat to permit said solderable material to harden and form a bond between said sleeve and said second rod.

4. The method of assembling a semiconductor device which includes a first rod of uniform cross-section, a second rod of uniform cross-section and an open-ended capsule having metallic sleeves with inside diameters of uniform cross-section sealed to the ends thereof which comprises plating said sleeves first relatively lightly with copper and then relatively heavily with tin to form the inside diameters of uniform cross-section, plating said first rod first relatively lightly with copper then relatively heavily with tin until the outside diameter of said first rod is of uniform cross-section and exceeds in size the inside diameter of one of said sleeves, mounting a die of semiconductor material on the end of said first rod, plating said second rod first relatively lightly with copper then relatively heavily with tin until the outside diameter of said second rod is of uniform cross-section and exceeds in size the inside diameter of the other of said sleeves, mounting a contact element on the end of said second rod, inserting said first rod in said one of said sleeves to expose unoxidized tinned contacting surfaces of said first rod and said one of said sleeves and to accumulate a first ring of solid tin surrounding the point of entry of said first rod into said one of said sleeves, thereafter applying heat to said first rod and said one of said sleeves in a non-oxidizing atmosphere to melt the tin plating on said first rod and on said one sleeve and to melt said first ring of solid tin, removing said heat to permit bonding of said first rod to said one of said sleeves, inserting said second rod in said other of said sleeves to expose unoxidized tinned contacting surfaces of said second rod and said other of said sleeves and to accumulate a second ring of solid tin surrounding the point of entry of said second rod into said other of said sleeves, adjusting the extent of insertion of said second rod into said other of said sleeves to obtain desired electrical characteristics determined by the contact of said contact element and said die of semiconductor material, thereafter applying heat to said second rod and said other of said sleeves in a non-oxidizing atmosphere to melt the tin plating on said second rod and on said other sleeve and to melt said second ring of solid tin, and removing said heat to permit cooling and solidification of said tin to form a bond between said second rod and said other of said sleeves.

References Cited in the file of this patent

UNITED STATES PATENTS

| | | |
|---|---|---|
| 930,927 | Berkstresser | Aug. 10, 1909 |
| 2,503,429 | Ziegler | Apr. 11, 1950 |
| 2,602,211 | Scaff et al. | July 8, 1952 |
| 2,693,555 | North et al. | Nov. 2, 1954 |